United States Patent
Yi

(10) Patent No.: US 10,384,427 B2
(45) Date of Patent: Aug. 20, 2019

(54) PLASTIC FLOORING HAVING REGISTRATION PATTERNS

(71) Applicant: Lu Ding Yi, JiangSU (CN)

(72) Inventor: Lu Ding Yi, JiangSU (CN)

( * ) Notice: Subject to any disclaimer, the term of this patent is extended or adjusted under 35 U.S.C. 154(b) by 0 days.

(21) Appl. No.: 15/263,393

(22) Filed: Sep. 13, 2016

(65) Prior Publication Data

US 2019/0176449 A1   Jun. 13, 2019

(51) Int. Cl.
*B32B 3/02* (2006.01)
*B32B 27/30* (2006.01)
*B32B 27/06* (2006.01)
*E04F 15/10* (2006.01)

(52) U.S. Cl.
CPC ............ *B32B 27/304* (2013.01); *B32B 27/06* (2013.01); *E04F 15/105* (2013.01); *E04F 15/107* (2013.01); *B32B 2307/50* (2013.01); *B32B 2471/00* (2013.01)

(58) Field of Classification Search
CPC ............ B32B 27/304; B32B 2307/554; B32B 2471/00; E04F 15/02; E04F 15/105
See application file for complete search history.

(56) References Cited

U.S. PATENT DOCUMENTS 4,612,074 A * 9/1986 Smith ............ B29C 59/046
156/209
2014/0144583 A1* 5/2014 Hakansson .......... B32B 38/145
156/277

* cited by examiner

*Primary Examiner* — Elizabeth E Mulvaney

(57) ABSTRACT

Plastic flooring contains: a substrate, a printing layer, and an abrasion resistance layer which are delivered into a rolling machine so that the rolling machine presses the substrate, the printing layer, and the abrasion resistance layer together. The substrate includes at least one soft film layer and at least one hard film layer, the printing layer forms on the substrate and has a convex portion and a concave portion, and the abrasion resistance layer forms on the printing layer. The rolling machine includes two delivery rollers, a guiding roller, and a pattern roller. The pattern roller has pressing patterns, and the pressing patterns have a depressed part and a raised part. When the substrate, the printing layer, and the abrasion resistance layer are pressed together, the convex portion corresponds to the depressed part and the concave portion corresponds to the raised part by using the registration transferring system.

5 Claims, 6 Drawing Sheets

5-1

5-2

5-3

PLASTIC FLOORING HAVING REGISTRATION PATTERNS

FIELD OF THE INVENTION

The present invention relates to plastic flooring which forms registration patterns thereon.

BACKGROUND OF THE INVENTION

Conventional plastic flooring contains: a substrate, a printing film and abrasion resistance film which are pressed by three press rollers or six press rollers of a rolling machine so as to form three-dimensional patterns thereon. However, the substrate and the printing film cannot be conveyed synchronously, so the substrate cannot correspond to pressing patterns of the printing film, and a depressed part and the raised part of the pressing patterns cannot align with a pattern portion of each press roller accurately.

The present invention has arisen to mitigate and/or obviate the afore-described disadvantages.

SUMMARY OF THE INVENTION

The primary objective of the present invention is to provide plastic flooring which forms registration patterns thereon.

To obtain the above objective, plastic flooring provided by the present invention contains: a printing layer, and an abrasion resistance layer which are all delivered into a rolling machine so that the rolling machine rolls and presses the substrate, the printing layer, and the abrasion resistance layer together.

The substrate includes at least one soft film layer and at least one hard film layer.

The printing layer forms on a top of the substrate and has a convex portion and a concave portion.

The abrasion resistance layer forms on the printing layer.

The substrate, the printing layer, and the abrasion resistance layer are pressed together by mating with a registration transferring system so that the convex portion and the concave portion of the printing layer press on the abrasion resistance layer and the substrate, thus form registration patterns on the plastic flooring.

The rolling machine is fixed in a support frame and includes two delivery rollers, a guiding roller, and a pattern roller, wherein the pattern roller has pressing patterns corresponding to the convex portion and the concave portion of the printing layer, and the pressing patterns have a depressed part and a raised part.

When the substrate, the printing layer, and the abrasion resistance layer are pressed together, the convex portion of the printing layer corresponds to the depressed part of the pressing patterns and the concave portion of the printing layer corresponds to the raised part of the pressing patterns by way of the registration transferring system, thus forming the registration patterns on the plastic flooring.

DETAILED DESCRIPTION OF THE PREFERRED EMBODIMENTS

Figure 1:
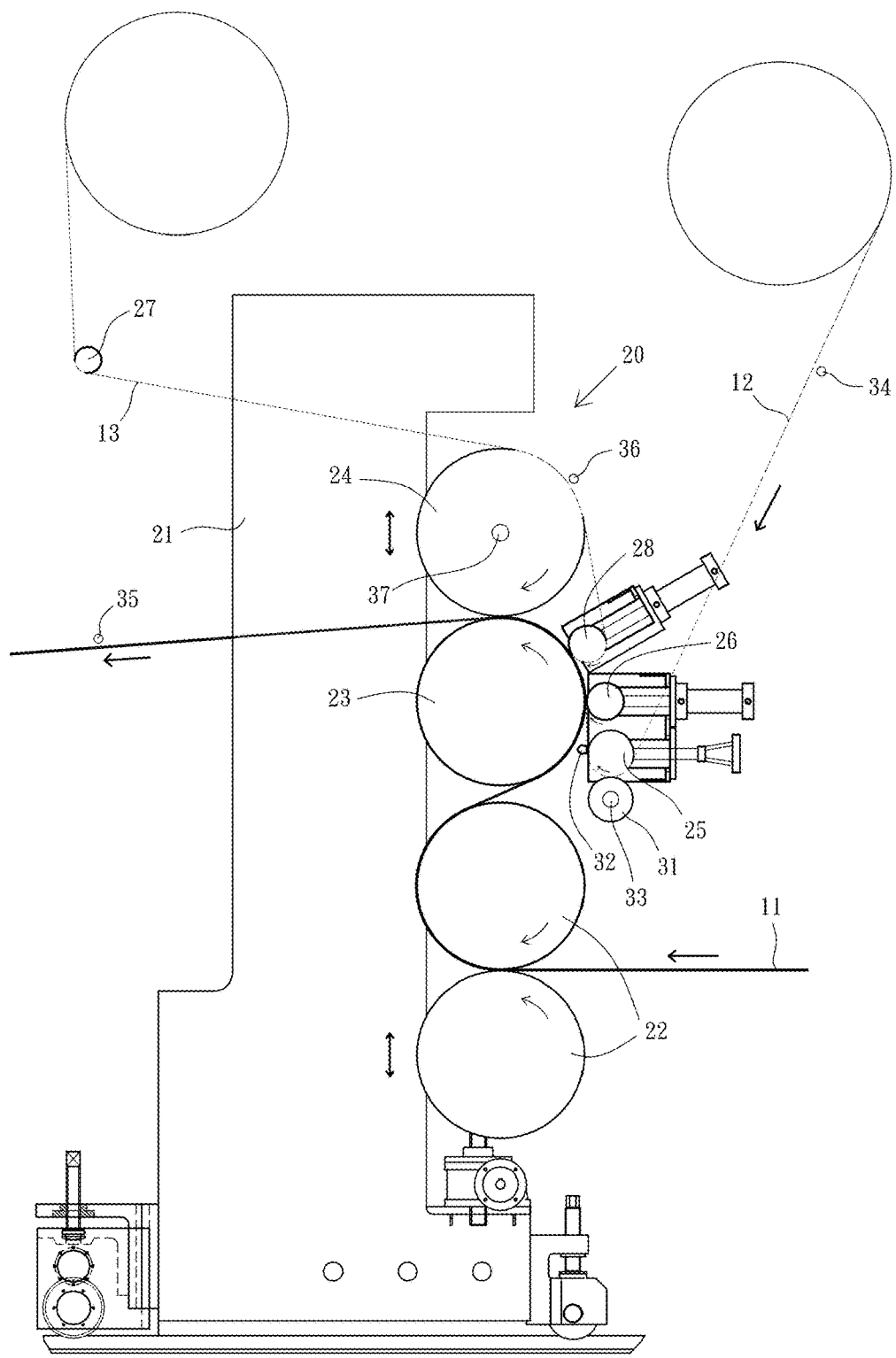
FIG. 1 is a schematic view showing the operation of a registration transferring system and a rolling machine according to a preferred embodiment of the present invention.
Figure 2:
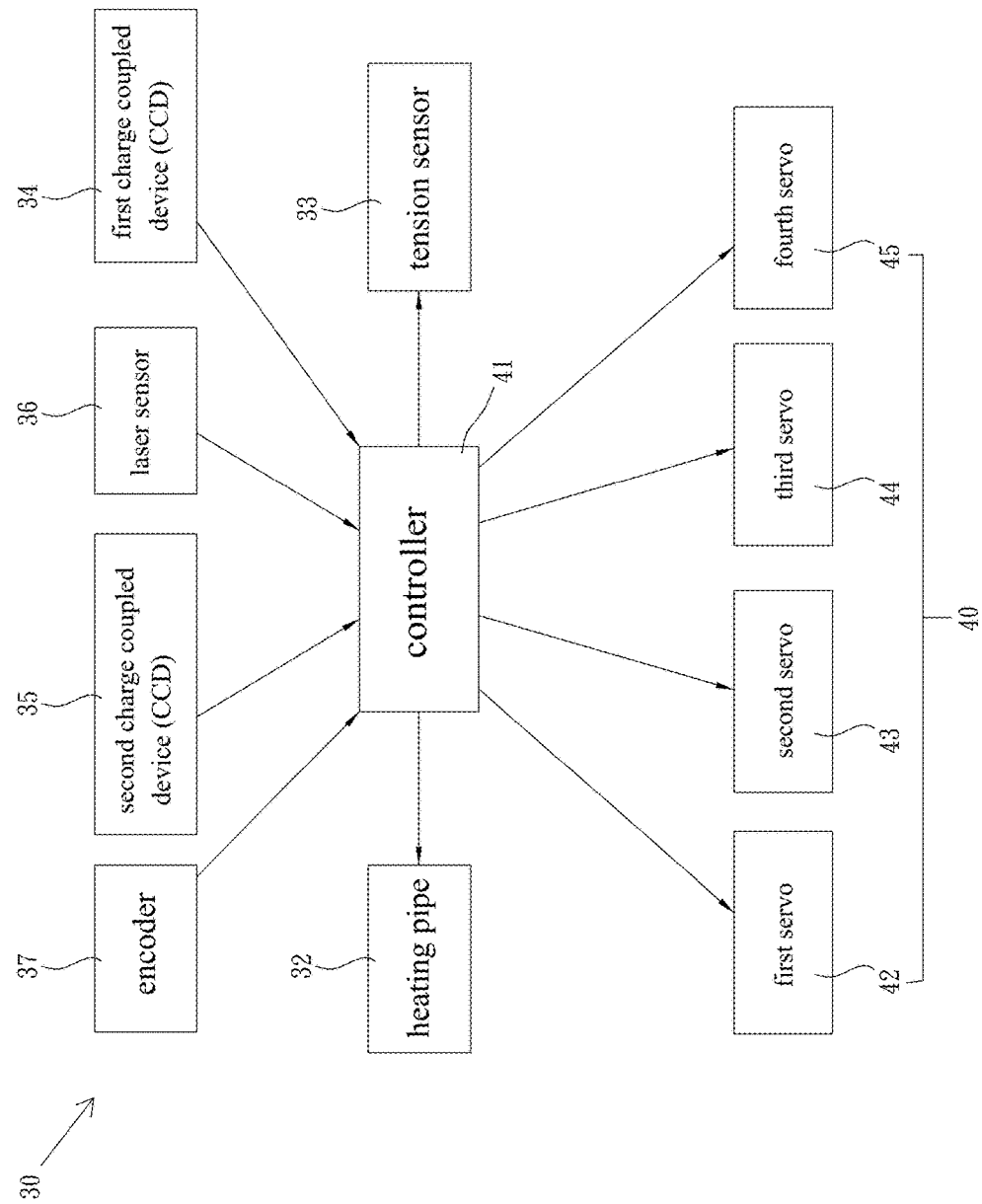
FIG. 2 is a schematic view showing the structure of an electronic control unit according to the preferred embodiment of the present invention.
Figure 3:
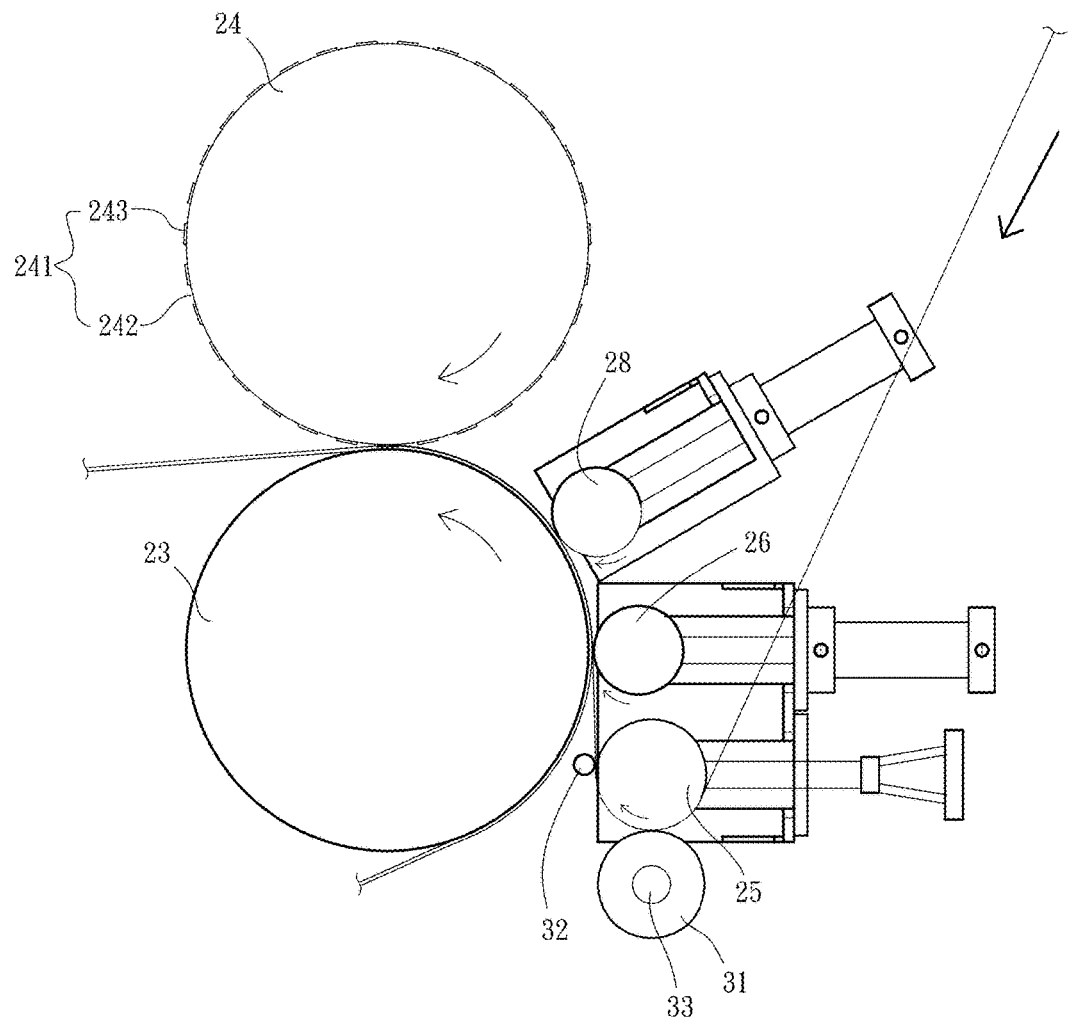
FIG. 3 is a schematic view showing the operation of a part of the registration transferring system and the rolling machine according to the preferred embodiment of the present invention.
Figure 4:
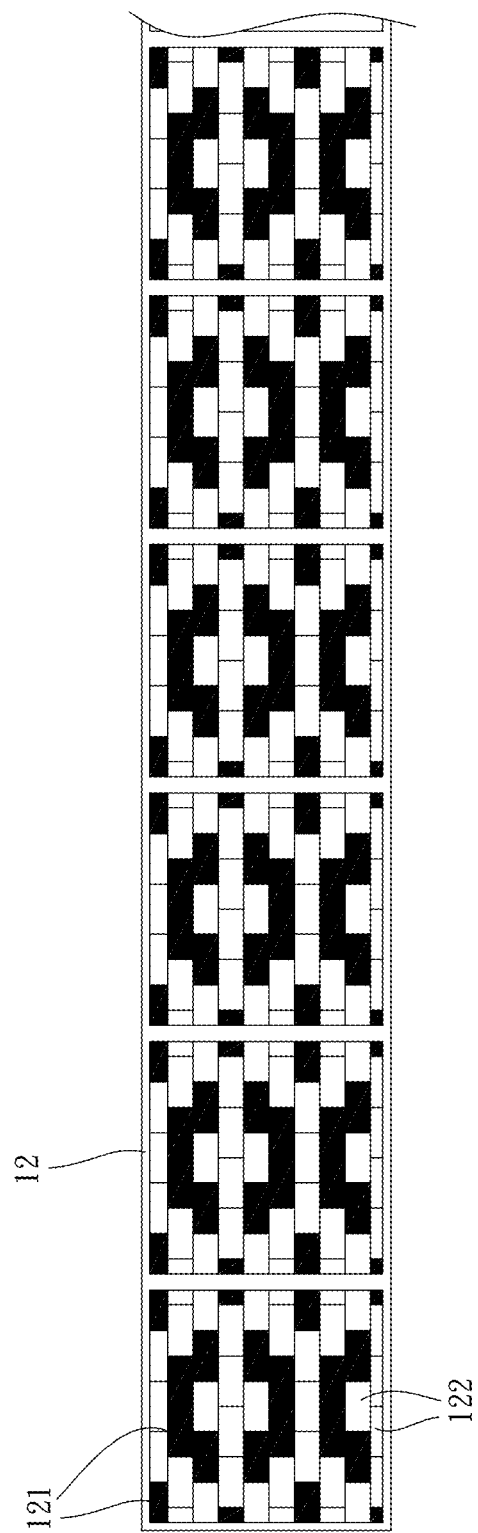
FIG. 4 is a schematic view showing the assembly of a printing layer according to the preferred embodiment of the present invention.

With reference to FIGS. 1 to 7, plastic flooring according to a preferred embodiment of the present invention comprises: a substrate 11, a printing layer 12, and an abrasion resistance layer 13 which are all delivered into a rolling machine 20 so that the rolling machine 20 rolls and presses the substrate 11, the printing layer 12, and the abrasion resistance layer 13 together by mating with a registration transferring system 30, thus forming registration patterns on the plastic flooring has.

The substrate 11 includes at least one soft film layer 111 and at least one hard film layer 112, wherein the at least one soft film layer 111 is made of polypinyl chloride (PVC) material in which plasticizer is added, and the at least one hard film layer 112 is made of polypinyl chloride (PVC) material in which plasticizer is not added. In another embodiment, the at least one soft film layer 111 and the at least one hard film layer 112 are made of polypinyl chloride (PVC) material in which calcium carbonate is added. Alternatively, the at least one hard film layer 112 is made of polypinyl chloride (PVC) material in which vesicant is added. In another embodiment, the at least one hard film layer 112 is made of polypinyl chloride (PVC) material in which vesicant or precipitated calcium carbonate (PCC) is added.

The printing layer 12 forms on a top of the substrate 11 and has a convex portion 121 and a concave portion 122.

The abrasion resistance layer 13 is transparent and forms on the printing layer 12 so as to protect the printing layer 12.

The rolling machine 20 is fixed in a support frame 21 and includes two delivery rollers 22, a guiding roller 23, and a pattern roller 24 which are all configured to deliver the substrate 11, the printing layer 12, and the abrasion resistance layer 13 into the rolling machine 20 so that the rolling machine 20 presses the substrate 11, the printing layer 12, and the abrasion resistance layer 13 together. Preferably, a first press roller 25 and a second press roller 26 are fixed among the printing layer 12, the guiding roller 23, and the pattern roller 24, and a third press roller 27 and a fourth press roller 28 are mounted among the abrasion resistance layer 13, the guiding roller 23, and the pattern roller 24. The pattern roller 24 has pressing patterns 241 corresponding to the convex portion 121 and the concave portion 122 of the printing layer 12, and the pressing patterns 241 have a depressed part 242 and a raised part 243.

The registration transferring system 30 is disposed on a delivery path along which the substrate 11, the printing layer 12, and the abrasion resistance layer 13 are delivered to the rolling machine 20. The registration transferring system 30 includes a feeding roller 31, a heating pipe 32, a tension sensor 33, a first charge coupled device (CCD) 34, a second charge coupled device (CCD) 35, a laser sensor 36, an encoder 37, and an electronic control unit (ECU) 40. The feeding roller 31 and the heating pipe 32 are secured beside the guiding roller 23, the tension sensor 33 is fixed on a rotary shaft of the feeding roller 31, the first CCD 34 is mounted on a starting position of the delivery path to the printing layer 12 so as to detect color codes and node information of the printing layer 12, and the second CCD 35 is disposed on a convey position of the delivery path to the plastic flooring so as to detect an error value of the plastic flooring. The laser sensor 36 is fixed outside the pattern roller 24 so as to detect an original mark of the pattern roller 24, the encoder 37 is secured on a rotary shaft of the pattern roller 24 so as to detect speed mark of the pattern roller 24, and the first CCD 34, the second CCD 35, the laser sensor 36, and the encoder 37 are electrically connected with the ECU 40 in a wireless communication manner so that sensed information of the first CCD 34, the second CCD 35, the laser sensor 36, and the encoder 37 are sent to the ECU 40.

The ECU 40 includes a controller 41, a first servo 42 configured to drive the feeding roller 31 to rotate, a second servo 43 configured to drive the pattern roller 24 to rotate, a third servo 44 configured to drive the guiding roller 23 to revolve, a fourth servo 45 configured to actuate the two delivery rollers 22 to rotate. The controller 41 is electrically connected with the first servo 42, the second servo 43, the third servo 44, the fourth servo 45, the first CCD 34, the second CCD 35, the encoder 37, the heating pipe 32, and the tension sensor 33, such that the controller 41 receives the sensed information of the first CCD 34, the second CCD 35, the laser sensor 36, and the encoder 37 so as to judge whether the printing layer 12 and the substrate 11 are delivered synchronously. For example, when the printing layer 12 and the substrate 11 are not delivered synchronously, the controller 41 controls the first servo 42, the second servo 43, the third servo 44, the fourth servo 45, the heating pipe 32, and the tension sensor 33 to operate so as to convey the printing layer 12 and the substrate 11 synchronously again. In addition, when the substrate 11, the printing layer 12, and the abrasion resistance layer 13 are pressed together, the convex portion 121 corresponds to the depressed part 242 and the concave portion 122 corresponds to the raised part 243 by way of the registration transferring system 30, thus forming the registration patterns on the plastic flooring.

The printing layer 12 is delivered through the first press roller 25 and the feeding roller 31, and the substrate 11 is outputted from the two delivery rollers 22 so as to be pressed with the printing layer 12 by the guiding roller 23 and the second press roller 26, thereafter the printing layer 12 and the substrate 11 are delivered into and are pressed by the guiding roller 23 and the pattern roller 24.

Figure 5:
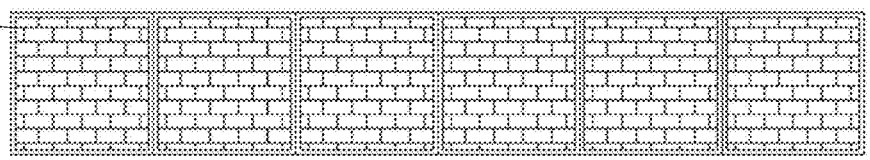
FIG. 5 is a schematic view showing the operation of the registration transferring system according to the preferred embodiment of the present invention.
Figure 5:
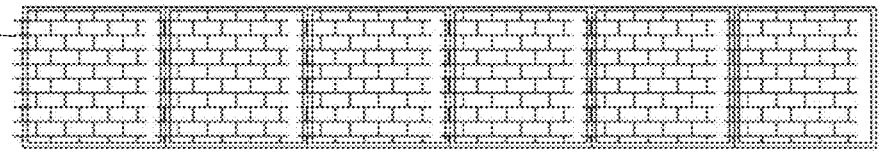
Figure 5:
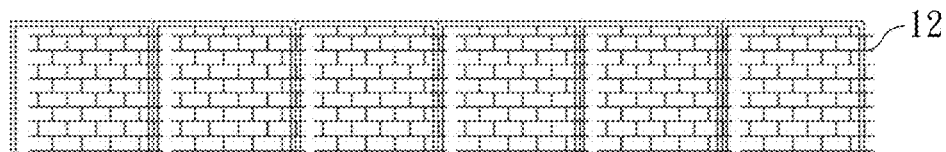
Figure 6:
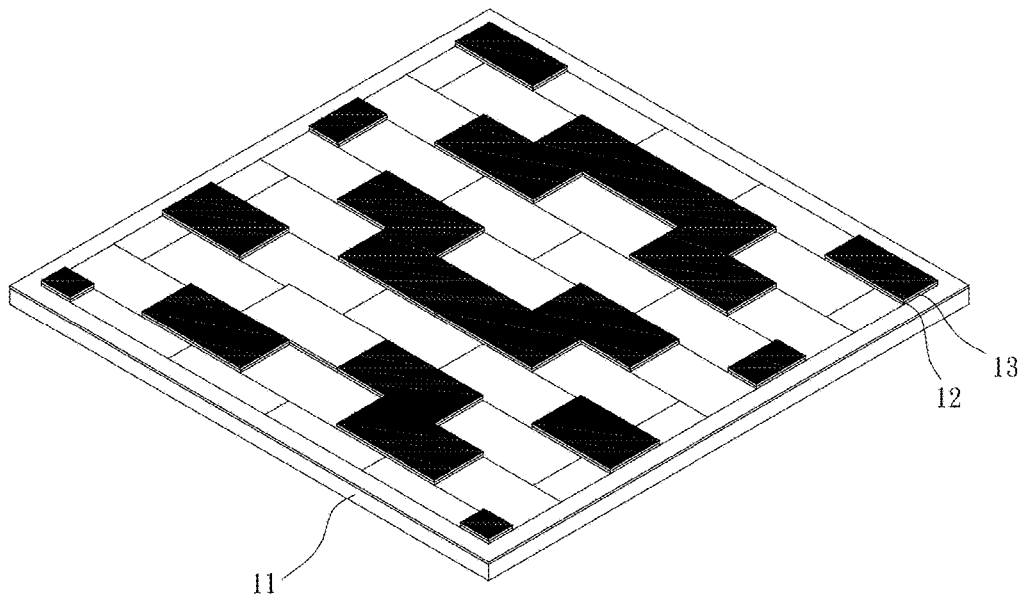
FIG. 6 is a schematic view showing the assembly of plastic flooring according to the preferred embodiment of the present invention.
Figure 7:
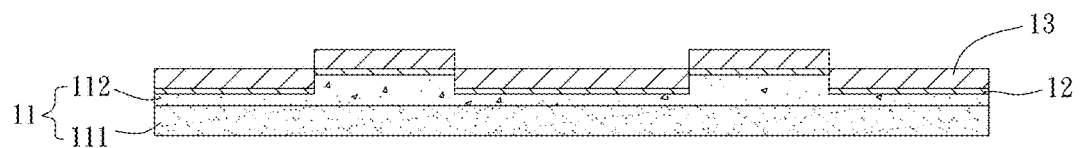
FIG. 7 is a cross sectional view showing the assembly of the plastic flooring according to the preferred embodiment of the present invention.

The registration transferring system 30 operates based on steps of (A), (B), (C), and (D):

In the step of (A), when the printing layer 12 is delivered slower than the substrate 11, the controller 41 controls the heating pipe 32 to heat the printing layer 12, hence the printing layer 12 shrinks and is delivered quickly, as shown in a part 5-3 of FIG. 5. Preferably, the controller 41 controls rotating speeds of the first servo 42, the second servo 43, the third servo 44, and the fourth servo 45. When the printing layer 12 and the substrate 11 are conveyed synchronously, the controller 41 turns off the heating pipe 32. When the printing layer 12 is delivered quicker than the substrate 11, as illustrated in a part 5-2 of FIG. 5, the controller 41 controls the second servo 43, the third servo 44, and the fourth servo 45 to drive the pattern roller 24, the guiding roller 23, and the two delivery rollers 22 to rotate quickly, and the controller 41 controls the first servo 42 and the tension sensor 33 to decelerate the feeding roller 31, hence the printing layer 12 is stretched and is delivered slowly, thus conveying the printing layer 12 and the substrate 11 simultaneously, as shown in a part 5-1 of FIG. 5.

In the step of (B), the first CCD 34 detects the color codes and the node information of the printing layer 12 and transmits the sensed information to the controller 41. The encoder 37 detects the speed mark of the pattern roller 24 and transmits the sensed information to the controller 41. The laser sensor 36 detects the original mark of the pattern roller 24 and sends the sensed information to the controller 41.

In the step of (C), the controller 41 compares the color codes of the printing layer 12 and the speed mark of the pattern roller 24 and judges whether the printing layer 12 and the substrate are delivered synchronously, after receiving the sensed information of the first CCD 34, the second CCD 35, the laser sensor 36, and the encoder 37. Furthermore, the controller 41 compares the node information of the printing layer 12 and the original mark of the pattern roller 24 so as to determine whether the printing layer 12 and the substrate 11 are stuck exactly.

In the step of (D), when the printing layer 12 and the substrate 11 are delivered synchronously, the plastic flooring is outputted, and the second CCD 35 detects the error value of the plastic flooring.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Plastic flooring comprising: a substrate, a printing layer, and an abrasion resistance layer which are all delivered into a rolling machine so that the rolling machine rolls and presses the substrate, the printing layer, and the abrasion resistance layer together;
   wherein the substrate includes at least one soft film layer and at least one hard film layer;
   wherein the printing layer forms on a top of the substrate and has a convex portion and a concave portion;
   wherein the abrasion resistance layer forms on the printing layer;
   wherein the substrate, the printing layer, and the abrasion resistance layer are pressed together by mating with a registration transferring system so that the convex portion and the concave portion of the printing layer press on the abrasion resistance layer and the substrate, thus form registration patterns on the plastic flooring;
   wherein the rolling machine is fixed in a support frame and includes two delivery rollers, a guiding roller, and a pattern roller, wherein the pattern roller has pressing patterns corresponding to the convex portion and the concave portion of the printing layer, and the pressing patterns have a depressed part and a raised part;
   wherein when the substrate, the printing layer, and the abrasion resistance layer are pressed together, the convex portion of the printing layer corresponds to the depressed part of the pressing patterns and the concave portion of the printing layer corresponds to the raised part of the pressing patterns by way of the registration transferring system, thus forming the registration patterns on the plastic flooring;

wherein a first press roller and a second press roller are fixed among the printing layer, the guiding roller, and the pattern roller, and a third press roller and a fourth press roller are mounted among the abrasion resistance layer, the guiding roller, and the pattern roller;

wherein the registration transferring system includes a feeding roller, a heating pipe, a tension sensor, a first charge coupled device (CCD), a second charge coupled device (CCD), a laser sensor, an encoder, and an electronic control unit (ECU); the feeding roller and the heating pipe are secured beside the guiding roller, the tension sensor is fixed on a rotary shaft of the feeding roller, the first CCD is mounted on a starting position of the delivery path to the printing layer so as to detect color codes and node information of the printing layer, and the second CCD is disposed on a convey position of the delivery path to the plastic flooring so as to detect an error value of the plastic flooring; the laser sensor is fixed outside the pattern roller so as to detect an original mark of the pattern roller, the encoder is secured on a rotary shaft of the pattern roller so as to detect speed mark of the pattern roller; and the first CCD, the second CCD, the laser sensor, and the encoder are electrically connected with the ECU in a wireless communication manner so that sensed information of the first CCD, the second CCD, the laser sensor, and the encoder are sent to the ECU.

2. The plastic flooring as claimed in claim 1, wherein the at least one soft film layer is made of polypinyl chloride (PVC) material in which plasticizer is added, and the at least one hard film layer is made of polypinyl chloride (PVC) material in which plasticizer is not added.

3. The plastic flooring as claimed in claim 1, wherein the at least one soft film layer and the at least one hard film layer are made of polypinyl chloride (PVC) material in which calcium carbonate is added.

4. The plastic flooring as claimed in claim 1, wherein the at least one hard film layer is made of polypinyl chloride (PVC) material in which vesicant is added.

5. The plastic flooring as claimed in claim 1, wherein the ECU includes a controller, a first servo configured to drive the feeding roller to rotate, a second servo configured to drive the pattern roller to rotate, a third servo configured to drive the guiding roller to revolve, a fourth servo configured to actuate the two delivery rollers to rotate; wherein the controller is electrically connected with the first servo, the second servo, the third servo, the fourth servo, the first CCD, the second CCD, the encoder, the heating pipe, and the tension sensor, such that the controller receives the sensed information of the first CCD, the second CCD, the laser sensor, and the encoder so as to judge whether the printing layer and the substrate are delivered synchronously; and wherein when the printing layer and the substrate are not delivered synchronously, the controller controls the first servo, the second servo, the third servo, the fourth servo, the heating pipe, and the tension sensor to operate so as to convey the printing layer and the substrate synchronously again.

* * * * *